United States Patent [19]

Mader

[11] Patent Number: 4,977,990
[45] Date of Patent: Dec. 18, 1990

[54] FREE FLOATING DAM FOR A FLUID SHEAR COUPLING APPARATUS

[75] Inventor: Gerald E. Mader, Indianapolis, Ind.
[73] Assignee: Schwitzer U.S.A. Inc., Indianapolis, Ind.
[21] Appl. No.: 414,765
[22] Filed: Sep. 29, 1989
[51] Int. Cl.$^5$ .............................................. F16D 35/00
[52] U.S. Cl. .................................. 192/58 B; 192/82 T
[58] Field of Search ........................... 192/58 B, 82 T

[56] References Cited

U.S. PATENT DOCUMENTS

| | | | |
|---|---|---|---|
| 3,463,282 | 8/1969 | Fujita et al. | 192/58 B |
| 4,086,988 | 5/1978 | Spence | 192/58 B |
| 4,271,946 | 6/1981 | Bridge | 192/58 B |
| 4,383,597 | 5/1983 | Blair | 192/58 B |
| 4,437,554 | 3/1984 | Haeck | 192/58 B |
| 4,485,902 | 12/1984 | Storz | 192/58 B |
| 4,564,094 | 1/1986 | Storz | 192/58 B |
| 4,741,421 | 5/1988 | Johnston | 192/58 B |

Primary Examiner—Rodney H. Bonck
Assistant Examiner—Andrea Pitts
Attorney, Agent, or Firm—Woodard, Emhardt, Naughton, Moriarty & McNett

[57] ABSTRACT

A fluid shear coupling comprises a driving member having a disc-shaped portion and a driven member defining a working chamber in which the driving member is received, the two members being mounted for relative rotation about a common axis, the driven member defining an annular groove facing the side of the driving member and further defining a circumferential cavity facing the outer perimeter of the driving member, and a one-piece, L-shaped dam having a radially extending portion received within the annular groove and an axially extending portion received within the circumferential cavity, each of the radially and axially extending portions including a first ramp surface facing in one direction and a second ramp surface facing in the other direction.

19 Claims, 3 Drawing Sheets

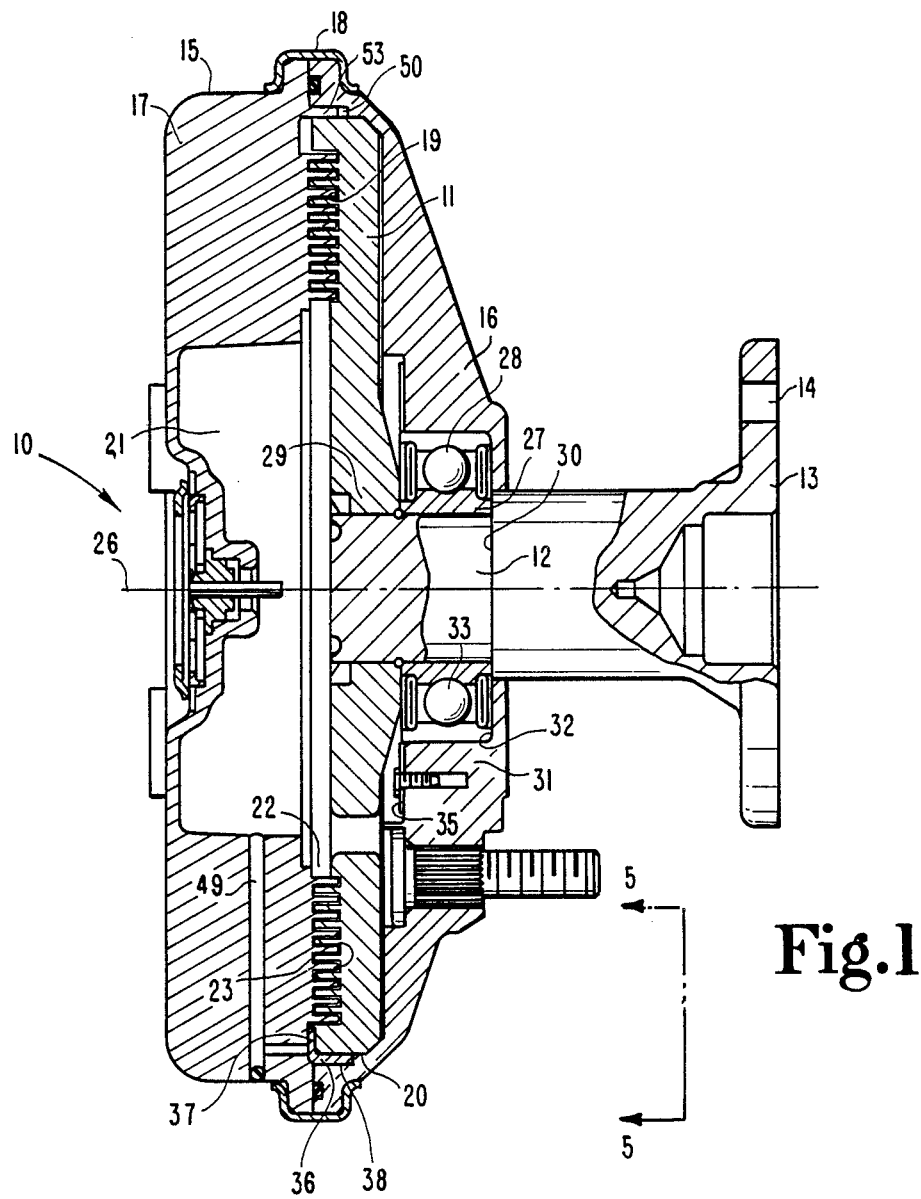
Fig.1
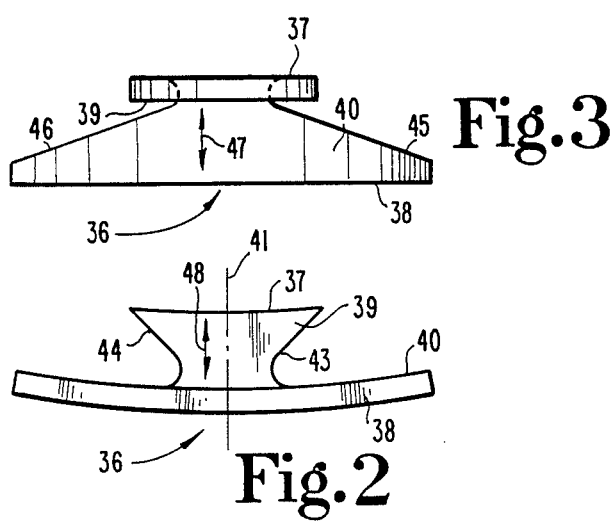
Fig.3
Fig.2

FREE FLOATING DAM FOR A FLUID SHEAR COUPLING APPARATUS

BACKGROUND OF THE INVENTION

1. Field of the Invention:

The present invention relates to the field of fluid shear couplings, and particularly to a novel design for a free floating dam used to provide return of shear fluid from the working chamber.

2. Description of the Prior Art:

Fluid shear couplings, often referred to as "viscous fan drives", are used in a variety of applications. The fan drive includes a working chamber defined by the cavity created by the bearing housing and cover assembly. The silicone fluid in this chamber will transmit torque from a rotor to the bearing housing which is physically attached to a fan blade assembly. The amount of silicone fluid in the working chamber dictates the fan speed due to fluid shearing action between the rotor and the walls of the working chamber. The difference between the engaged and disengaged modes for a fan drive is directly proportional to the amount of torque transmitting silicone fluid present in the working chamber.

Fluid shear couplings are typically used to drive engine cooling fans on automotive vehicles. These couplings have a disengaged mode in which the fan is rotated at a relatively low angular velocity and an engaged mode in which the angular velocity is relatively high. For fuel conservation and noise reduction, it is preferred to have the disengaged mode at as low an angular velocity as possible. Under certain conditions, it is desirable to have the fluid pumped out of the working chamber and into the reservoir or to a recirculation passageway as quickly as possible.

Dam systems used to pump fluid out of the working chamber are normally placed near the outside diameter of the rotor. The purpose of the dam is to build fluid pressure at the reservoir return passageway, commonly referred to as the "dump hole". This fluid pressure is the result of the differential speed between the rotor (at engine speed) and the cover (at fan speed), the viscosity of the silicone fluid, and the clearance between the rotor and the dam. The fluid pressure at the dam will cause the fluid to flow back to the reservoir through the passageway. The amount of fluid pressure available due to the indicated parameters is an indication of the efficiency of the dam. The level of fluid in the working chamber is due to the dam's efficiency in a steady-state and results in the disengaged fan speed.

Two types of dam designs known in the prior art are fixed clearance dams and adjustable spring-loaded dams. A third design is the free floating dam which allows greater tolerances to be permitted without the complexity of springs. For fixed clearance dams, there is a requirement for tight control of the rotor, cover and dam assembly tolerances to maintain a close, fixed dam clearance. Such dams require attachment to the cover, by roll pins, etc. Spring-loaded dams permit looser control of the rotor and cover tolerances since the dam adjusts to compensate for the resulting clearances. However, the design requires extra parts such as springs for the adjustment, and assembly can be difficult and tedious. Free floating dams allow for looser control of the rotor and cover tolerances without the requirement for springs. Assembly is also easier.

In U.S. Pat. No. 4,271,946, issued to Bridge on June 9, 1981, there is described a pumping or dam element for a temperature responsive viscous fan drive. The bridge device is typical including a disc which rotates within a housing that defines a return hole adjacent the outer portion of the disc. An L-shaped pumping element is described which includes a first portion along the circumferential wall at the outer perimeter of the disc and a second portion in an annular groove at the side of the disc adjacent the return hole. The L-shaped dam is welded to the valve plate through which the return hole extends.

A fluid shear coupling having two dam elements oriented perpendicular to one another is disclosed in U.S. Pat. No. 4,383,597, issued to Blair on May 17, 1983. The Blair apparatus includes a rotor received within a working chamber and a return hole extending in through one side of the housing next to the outer portion of the disc. One of the dam elements comprises a projection which is fixed in the cylindrical cavity adjacent the outer periphery of the disc, and includes an angled surface to direct fluid to the side of the housing where the return hole is located. A separate dam is attached in an annular groove adjacent the outer portion of the disc and includes a surface surrounding the return hole to direct fluid into the hole in conventional fashion. In the Blair device, the two dam elements are separate and each is attached to the housing.

A variety of other dam designs are also known in the art. For example, in U.S. Pat. No. 4,564,094, issued to Storz on Jan. 14, 1986, there are shown various shaped planar dam structures with tabs received in a slot, which allows the dam to move circumferentially between two positions. The two positions correspond to placement of the dam in relation to one of two different return dump holes, depending on the relative rotation of the rotor and housing. Other examples of dam designs are shown in U.S. Pat. Nos. 4,564,093 and 4,485,902, issued to Storz on Jan. 14, 1986 and Dec. 4, 1984, respectively; and 4,086,988, issued to Spence on May 2, 1978.

SUMMARY OF THE INVENTION

Briefly describing one aspect of the present invention, there is provided a fluid shear coupling which includes a driving member and a driven member mounted together for rotation about a common axis, the driven member defining a working chamber including a shear surface facing a shear surface on the driving member, the working chamber defining an annular groove facing the side of the driving member and a circumferential cavity facing the outer perimeter of the driving member, and a one-piece, L-shaped dam including a radially extending portion received within the annular groove in the working chamber and an axially extending portion received within the circumferential cavity in the working chamber, the dam being free from attachment to the driven member. In one embodiment, the driven member includes a bearing housing and a cover together defining the working chamber, and the dam is contained within a cavity defined by the bearing housing, the cover and bearing housing being positionable in different relative positions to place the dam on one side or the other of a dump hole defined by the cover. In an alternate embodiment, the dam is received between and is freely movable between first and second stops defined by the driven member to position the dam on one side or the other of a dump hole extending in the annular groove.

It is an object of the present invention to provide a fluid shear coupling that has increased efficiency and ease of assembly associated with the dam used to return shear fluid to the reservoir.

It is a further object of the present invention to provide a dam which operates more efficiently and provides a lower fan disengaged speed.

Another object of the present invention is to provide a fluid shear coupling and dam arrangement which eliminates additional hardware, such as springs, that are normally used to absorb the stack up of tolerances associated with the cover and rotor assembly.

It is still a further object of the present invention to Provide better cooling of the shear fluid by increasing the flow rate of fluid through the return passageway.

It is also an object of the present invention to provide a fluid shear coupling and dam arrangement which permits ready variation of the distance from the dam to the dump hole to adjust the disengaged speed of the unit to match application requirements.

Another object of the present invention is to provide a symmetrical, free floating dam and coupling assembly which can be used in a clockwise or counter-clockwise application.

Further objects and advantages of the present invention will become apparent from the description of the preferred embodiment which follows.

BRIEF DESCRIPTION OF THE DRAWINGS

FIG. 1 is a side, elevational view, partially in cross-section, showing a fluid shear coupling and free floating dam in accordance with the present invention.

FIG. 2 is a rear, elevational view of a fluid dam according to the present invention.

FIG. 3 is a top, plan view of the fluid dam of FIG. 2.

DESCRIPTION OF THE PREFERRED EMBODIMENT

Figure 5:
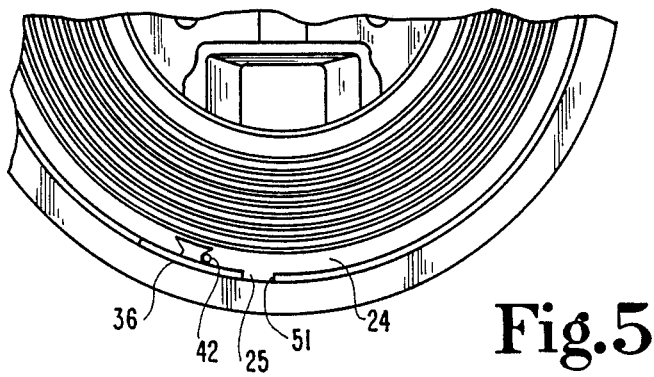
FIG. 5 is a partial, rear elevation of a fluid shear coupling as shown in FIG. 1, and particularly showing the shear dam in one of its two alternate positions associated with clockwise rotation of the driving member relative the driven member.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring in particular to the drawings, there is shown a fluid shear coupling apparatus 10 constructed in accordance with the present invention. The embodiment of FIG. 1 generally comprises a driving member connected with an external drive source, and a driven member mounted to the driving member for relative rotation about a common axis. The driving member includes a disc-shaped rotor 11 secured to a shaft 12. The shaft includes a mounting portion 13 which is connectable to an external drive source, such as by the reception of bolts (not shown) through apertures 14. A typical external drive source is a vehicle engine for an embodiment in which the apparatus 10 is used as a coupling device for driving a plurality of fan blades mounted to the driven member. The driven member 15 includes a bearing housing 16 and a cover 17 secured together by a metal band 18.

The disc-shaped portion of the driving member 11 defines a shear surface 19 which may have a variety of configurations, such as the annular ridges and grooves as shown in FIG. 1. Other shapes, including planar shear surfaces are known in the art. The driving member 11 also has a cylindrical, outer perimeter 20. The driven member includes a shear fluid reservoir 21 and a working chamber 22 in which the driving member 11 is received. Working chamber 22 includes a shear surface 23 which faces and is adjacent to the shear surface 19 of driving member 11. In customary fashion, the close proximity of the shear surfaces of the driving and driven members, in combination with the shear fluid received therebetween, provides for coupling action between the two members to transmit rotational force to the driven member. The shear surface 23 may again have a variety of shapes complementary to the configuration of the shear surface 19 of the driving member 11.

The working chamber defines an annular groove 24 which faces the side of the driving member 11 adjacent the outer perimeter of the driving member. The working chamber also defines a circumferential cavity 25 which faces the outer perimeter 20 of the driving member.

The driven member and driving member are mounted together to have relative rotation about the central axis 26. The bearing housing 16 is bearingly mounted to the shaft 12. Inner race 27 of ball bearings 28 is received between the hub portion 29 of the driving member and a shoulder 30 of the shaft 12. The bearing housing 16 defines a central hub portion 31 defining a shoulder 32 against which one side of the outer race 33 of the ball bearings is received. The hub portion further defines a circumferential recess 34 to which a ring 35 is secured, and bears against the other side of the outer race 33.

The foregoing description of the fluid shear coupling 10 is comparable to the device as shown and described in U.S. Pat. No. 4,779,323, issued to Bloemendaal on Oct. 25, 1988. The related portions of the Bloemendaal Patent are hereby incorporated by reference. It will be appreciated that the present invention is useful with any of a large variety of fluid shear couplings in which a driving member is rotatably received within the working chamber of an outer, driven member.

Mounted within the fluid shear coupling is a one-piece, L-shaped dam 36. The dam includes a radially extending portion 37 received within the annular groove 24, and an axially extending portion 38 received within the circumferential cavity 25. The radially extending portion includes a surface 39 which faces and is adjacent to the side of the driving member 11. The axially extending portion includes a surface 40 which faces and is adjacent the outer perimeter 20 of the driving member 11.

Figure 4:
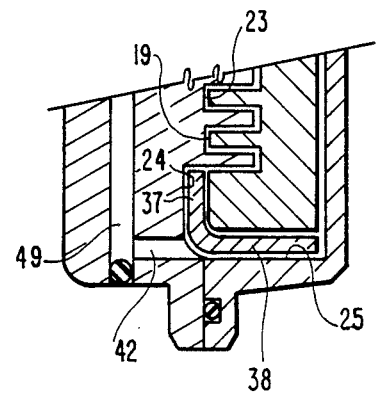
FIG. 4 is a partial, enlarged view of the fluid shear coupling of FIG. 1, showing in particular the placement of the fluid dam relative the annular groove and circumferential cavity in which it is received.

The dam is preferably symmetrical about the plane 41 which extends perpendicular to the axially and radially extending portions at the center of the dam. The radially and axially extending portions are designed to direct fluid in the direction of a dump hole 42 (FIG. 4) which opens out on the annular groove 24. The dam is designed to permit its reception on either side of the dump hole, the symmetry permitting the dam to be located on either one side or the other of the dump hole and to equally well direct fluid toward the hole.

The radially extending portion 37 defines a first ramp surface 43 and a second ramp surface 44, tapered inwardly as shown in FIG. 2. Similarly, the axially extending portion 38 includes a first ramp surface 45 and a second ramp surface 46, both being tapered inwardly as shown in FIG. 3. Thus, the first and second ramp surfaces of the radially extending portion of the dam are angled inwardly in the direction toward the axially extending portion. Similarly, in the preferred embodiment, the first and second ramp surfaces of the axially extending portion of the dam are angled inwardly in the direction toward the radially extending portion.

The axially extending portion 38 has a width dimension in the axial direction 47, as well as a length dimension perpendicular thereto. The radially extending portion 37 has a width dimension in the radial direction 48, as well as a length dimension. In the preferred embodiment, the length dimension of the axially extending portion 38 is greater than the length dimension of the radially extending portion 37, and most preferably is about twice the length dimension of the radially extending portion.

The dam 36 operates as a pumping element to direct shear fluid through the dump hole and back through radial passageway 49 to the fluid reservoir 21. In general, the operation of the dam is comparable to other pumping arrangements. The dam is located adjacent the dump hole and the ramp surfaces, such as 43 and 45, direct shear fluid into the dump hole. Due to the nature of coupling by means of the shear fluid, there is a relative rotation between the driving member 11 and the driven member 15. The driving member will therefore force the shear fluid against the ramp surfaces, and the resulting pressure build up will force the fluid through the dump hole and then radially into the reservoir. To enhance the pumping action, the surfaces 39 and 40 which face the disc-shaped driving member, are shaped and positioned to lie in close proximity to the adjacent surfaces of the driving member.

Figure 6:
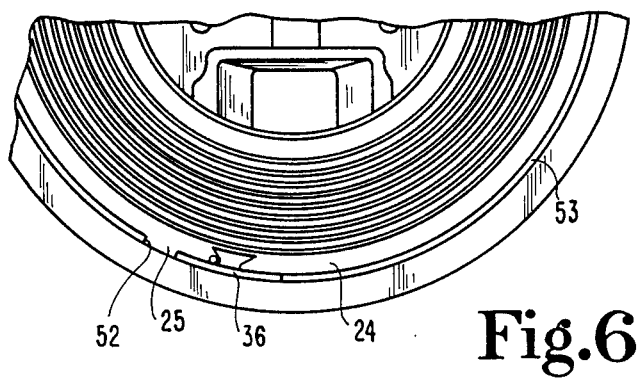
FIG. 6 is a partial, rear elevation of a fluid shear coupling as shown in FIG. 1, and particularly showing the shear dam in one of its two alternate positions associated with counter-clockwise rotation of the driving member relative the driven member.

The embodiment of FIG. 1 provides an automatic positioning of the dam relative the dump hole based upon the relative rotation of the driving member and the driven member. In this embodiment, the annular groove 24 extends about the cover 17. The circumferential cavity 25 extends preferably for only a short portion of the driven member. For example, as shown in FIG. 1, the cover 17 may include an annular flange 53 which is received within a recess 50 in the bearing housing 16. In the region of the dump hole 42, the flange 53 is terminated, thus leaving a short, circumferential cavity 25. The flange 53 terminates in a first end 51 and a second end 52 which act as first and second stops on either side of the dam and the dump hole. As shown in FIGS. 5 and 6, the dam is sized to be freely movable between the first and second stops, 51 and 52, respectively.

As shown, the end stops 51 and 52 are provided in the circumferential cavity 25 by ends of the annular flange 53. Alternatively, the end stops could be provided along the annular groove 24, although this is less preferred.

The dam has a first position (FIG. 6) received against the first stop 51 in which the second ramp surfaces 44 and 46 are located adjacent and facing the dump hole. In a second position (FIG. 5), the dam is located against the second stop 52 and the first ramp surfaces 43 and 45 are located adjacent and facing the dump hole 42. In the position shown in FIG. 5, the dam is positioned for operation with a driving member which is rotating clockwise (as viewed in FIG. 5) relative the driven member. The position shown in FIG. 6 is associated with a driving member which is operating in a counterclockwise direction (as viewed in FIG. 6) relative the driven member. The rotation of the driving member relative the driven member will force fluid in the same direction relative the driven member, and for the embodiment of FIG. 1 will act both to move the dam into the appropriate position and to cause fluid to flow through the dump hole and back to the reservoir.

Figure 7:
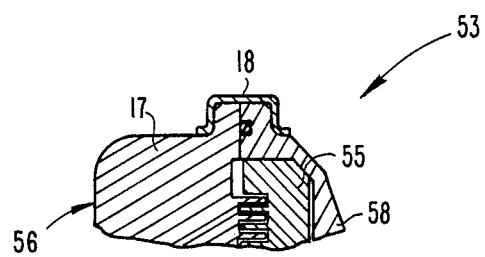
Figure 8:
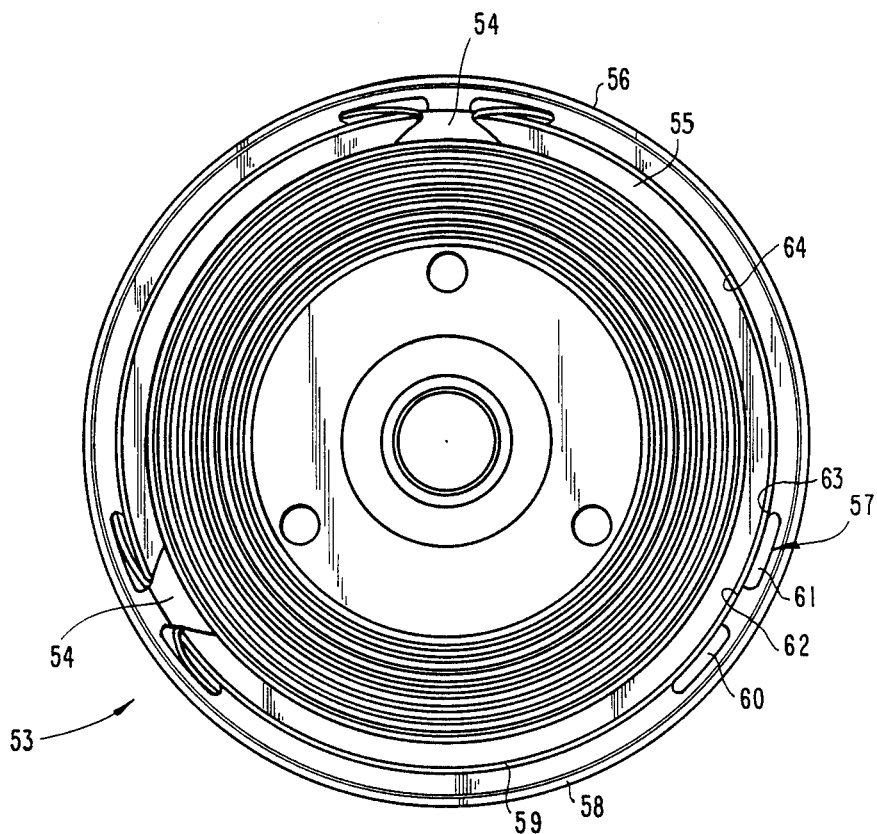

An alternate preferred embodiment of the present invention is shown particularly in FIGS. 7 and 8. The fluid shear coupling 54 is configured in the same manner as described with respect to the coupling apparatus 10 of FIG. 1, with certain modifications as hereafter described. The dams 36 are identical to the dam 36 shown in FIGS. 2 and 3, and remain unattached to either the driving member or rotor 55 or the driven member 56. However, instead of being contained by a cover 17 as in FIG. 1, the dams 36 are received in recesses 57 defined by the bearing housing 58. In the preferred embodiment, three dams and associated recesses 57 are provided in equiradially spaced positions.

It will be appreciated that the recesses in the bearing housing receive the axially extending portion 38 of the dams. The recesses are sized to fix the dams in a predetermined circumferential position. The position of the dams relative the dump holes is controlled by the relative positioning of the bearing housing 58 and the cover 17, as in FIG. 1, placed thereon. To facilitate alignment of the cover and bearing housing, locating marks may be placed on the outer perimeter of each to identify the placement of the dams and dump holes. In this manner, the bearing housing 58 and cover 17 may be assembled for either clockwise or counterclockwise rotation. The bearing housing and cover are then secured together in any of a variety of known manners, such as by the use of a magneformed band as shown in FIG. 7. As in the embodiment of FIG. 1, the symmetry of the dams permits the alternate assembly positions.

The recesses 57 may have differing shapes, provided the dams are positioned appropriately relative the rotor 55. In the simplest form, the each recess 57 can comprise single, continuous recess shaped complementary to the axially extending portion 38 of a dam. The recess in that form would have a continuous outer cylindrical surface against which would be received the axially extending portion 38. Accurate radial positioning of this cylindrical surface would place the inward-facing surface 40 of the dam adjacent the outer perimeter 59 of the rotor 55.

As shown in FIG. 8, it is preferred to contain the dams in recesses comprising separate, adjacent cavities 60 and 61 with an intermediate land area 62. Each cavity 60 and 61 is provided with an outer radius defining an overhanging edge, such as 63. The relative size of the dam and the cavities 60 and 61 is such that the ends of the axially extending portion 38 are received under and contained in position by the overhanging edges 63. At the same time, the center portion of the dam is received against the intermediate land 62, providing a somewhat bowed shape to the dam as shown in FIG. 8.

The described configuration of the cavities 60 and 61 and intermediate land 62 has the following advantages. In fabrication, the bearing housing 58 is typically a cast structure, and the cavities 60 and 61 are cast into the housing. Therefore, the outer surfaces of the cavities are cast surfaces and display the tolerances achievable with casting methods. However, the outer diameter 59 of the rotor 55 and the inner diameter 64 of the bearing housing 58 are preferably machined surfaces to have the higher tolerances achievable with machining methods. It is desirable to place the dams 36 in closely controlled position relative the rotor 55 in order to obtain maximum efficiency of the dams. In the case of a single, continuous recess 57, the position of the dam is established by placement of the axially extending portion 38 against a cast surface. In view of the lesser tolerances which can be obtained for casting, the spacing of the dam relative the rotor is diminished. However, as shown in FIG. 8, the land 62 corresponds to the inner diameter 64 of the bearing housing and therefore may be machined in the same operation. With the center portion of the dams resting on this intermediate land area, the spacing between that portion of the dams and the rotor is dictated by closely controllable dimensions, namely the outer diameter 59 of the rotor, the inner diameter of the land, and the thickness of the axially extending portion of the dam. These dimensions are readily established with close tolerances to achieve the desired high efficiency for the dams as described.

It is a feature of the present invention that the disengagement speed of the fluid shear coupling can be controlled by adjusting the placement of the dams relative the dump holes. This is accomplished by varying the distance between the dam and the dump hole, since movement of the dam away from the dump hole will raise the disengagement speed. Although there is a sacrifice of dam efficiency as the dam is moved from the dump hole, the decrease in efficiency is at a lesser rate than the change in disengagement speed, and movement of the dam can be effectively used to match the coupling design to application requirements.

In the embodiment of FIG. 1, the change in positioning of the dams may be accomplished in two manners. First, the dam stops 51 and 52 may be changed in position, such as by further machining back the flange 53. Alternatively, the shape or length of the dam 36 may be altered. Adjustment for the embodiment of FIG. 8 is readily accomplished by varying the relative positioning of the bearing housing 58 and the cover. To facilitate this adjustment, the locating marks could be provided on the outer perimeters of the bearing housing and cover either to indicate a specific alignment from which adjustments could be made or to indicate alternate alignments corresponding with different desired positions.

The dam design of the present invention provides several advantages. The dam efficiency is improved due to the nature of the dam's geometry and the geometric planes in which it acts. The dam consists of two portions, one extending axially and the other extending radially. Further, the ramp surfaces are angled and direct or focus the fluid towards the dump hole. The use of the two portions of the dam provide for fluid to be accumulated both along the shear surface of the driving member and at its outer perimeter. The dam could equally be designed to conform to an outer perimeter which is angled at other than 90° to the side surface of the driving member with corresponding changes in the positions of the two dam portions.

Due to the improved efficiency and the torque reduction at the outer diameter, the disengaged speed for the coupling is lower. The fan disengaged speed is a result of the remaining fluid in the working chamber in a closed valve, steady state condition. This remaining fluid is converted into torque transmission between the driving member, i.e., the rotor, and the driven member, i.e, the cover or housing. The amount of torque transmitted is related to the clearance between the two parts, and the level of fluid therein. The tighter the clearance between the parts, the greater is the torque transmitting ability. The present design provides for a rotor having an outside diameter with a minimum clearance equal to the maximum thickness of the axially extending portion of the dam. Therefore, the remaining fluid in the working chamber does not contribute as much to the disengaged fan speed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A fluid shear coupling which comprises:
   a driving member including a disc-shaped portion having a side defining a shear surface and having a cylindrical, outer perimeter;
   a driven member including a shear fluid reservoir and defining a working chamber within which said driving member is received, the working chamber including a shear surface facing and adjacent to the shear surface of said driving member, the working chamber defining an annular groove facing the side of said driving member adjacent the outer perimeter of said driving member, the working chamber also defining a circumferential cavity facing the outer perimeter of said driving member, said driven member including a bearing housing, a cover, and coupling means for coupling the cover to the bearing housing;
   mounting means for mounting said driven member to said driving member to be rotatable about a common axis;
   a one-piece, L-shaped dam including a radially extending portion and an axially extending portion, the radially extending portion being received within the annular groove in the working chamber and having a surface facing and adjacent the side of said driving member, the axially extending portion being received within the circumferential cavity in the working chamber and having a surface facing and adjacent the outer perimeter of said driving member, each of the radially and axially extending portions including a first ramp surface at one end facing generally in a first direction and a second ramp surface at the opposite end facing generally in a second direction opposite to the first direction; and,
   one of the bearing housing and the cover defining a fluid return passageway including a dump hole opening into the annular groove, the other of the bearing housing and cover defining a cavity within which is received said dam, the coupling means of said driven member being for selectively coupling the cover to the bearing housing with said dam having one of two alternative positions, the first position being in which the second ramp surfaces are located adjacent and facing the dump hole and the second position being in which the first ramp surfaces are located adjacent and facing the dump hole.

2. The invention of claim 1 in which the bearing housing defines a cavity in which is received the axially extending portion of said dam.

3. The invention of claim 1 in which said dam is symmetrical about a plane extending perpendicular to the axially extending and radially extending portions through the center of said dam.

4. The invention of claim 1 in which the first and second ramp surfaces of the axially extending portion of said dam are angled inwardly in the direction toward the radially extending portion.

5. The invention of claim 1 in which the first and second ramp surfaces of the radially extending portion of said dam are angled inwardly in the direction toward the axially extending portion.

6. The invention of claim 5 in which the first and second ramp surfaces of the axially extending portion of said dam are angled inwardly in the direction toward the radially extending portion.

7. The invention of claim 6 in which said dam is symmetrical about a plane extending perpendicular to the axially extending and radially extending portions through the center of said dam.

8. A fluid shear coupling which comprises:
a driving member including a disc-shaped portion having a side defining a shear surface and having a cylindrical, outer perimeter;
a driven member including a shear fluid reservoir and defining a working chamber within which said driving member is received, the working chamber including a shear surface facing and adjacent to the shear surface of said driving member, the working chamber defining an annular groove facing the side of said driving member adjacent the outer perimeter of said driving member, the working chamber also defining a circumferential cavity facing the outer perimeter of said driving member;
mounting means for mounting said driven member to said driving member to be rotatable about a common axis;
a one-piece, L-shaped dam including a radially extending Portion and an axially extending portion, the radially extending portion being received within the annular groove in the working chamber and having a surface facing and adjacent the side of said driving member, the axially extending portion being received within the circumferential cavity in the working chamber and having a surface facing and adjacent the outer perimeter of said driving member, each of the radially and axially extending portions including a first ramp surface at one end facing generally in a first direction and a second ramp surface at the opposite end facing generally in a second direction opposite to the first direction; and, said driven member defining a fluid return passageway including a dump hole opening into the annular groove, the working chamber defining first and second stops on either side of said dam and the dump hole, the first stop being on the same side of said dam as the first ramp surfaces and the second stop being on the same side of said dam as the second ramp surfaces, said dam being freely movable within the annular groove and the circumferential cavity between the first and second stops, said dam having a first position against the first stop in which the second ramp surfaces are located adjacent and facing the dump hole, said dam having a second position against the second stop in which the first ramp surfaces are located adjacent and facing the dump hole.

9. The invention of claim 8 in which the first and second stops are defined by the circumferential cavity of the working chamber.

10. The invention of claim 8 in which said dam is symmetrical about a plane extending perpendicular to the axially extending and radially extending portions through the center of said dam.

11. The invention of claim 8 in which the axially extending portion of said dam has a width dimension in the axial direction and a length dimension, and in which the radially extending portion of said dam has a width dimension in the radial direction and a length dimension, the length dimension of the axially extending portion being greater than the length dimension of the radially extending portion.

12. The invention of claim 11 in which the length dimension of the axially extending portion is about twice the length dimension of the radially extending portion.

13. The invention of claim 8 in which the first and second ramp surfaces of the axially extending portion of said dam are angled inwardly in the direction toward the radially extending portion.

14. The invention of claim 8 in which the first and second ramp surfaces of the radially extending portion of said dam are angled inwardly in the direction toward the axially extending portion.

15. The invention of claim 14 in which the first and second ramp surfaces of the axially extending portion of said dam are angled inwardly in the direction toward the radially extending portion.

16. The invention of claim 15 in which said dam is symmetrical about a plane extending perpendicular to the axially extending and radially extending portions through the center of said dam.

17. The invention of claim 15 in which the axially extending portion of said dam has a width dimension in the axial direction and a length dimension, and in which the radially extending portion of said dam has a width dimension in the radial direction and a length dimension, the length dimension of the axially extending portion being greater than the length dimension of the radially extending portion.

18. The invention of claim 17 in which the length dimension of the axially extending portion is about twice the length dimension of the radially extending portion.

19. The invention of claim 18 in which said dam is symmetrical about a plane extending perpendicular to the axially extending and radially extending portions through the center of said dam.

* * * * *